United States Patent
Chang

(10) Patent No.: US 6,942,235 B2
(45) Date of Patent: Sep. 13, 2005

(54) FOLDABLE BICYCLE

(76) Inventor: Wen-Pin Chang, P.O. Box 55-125, Taichung (TW)

( * ) Notice: Subject to any disclaimer, the term of this patent is extended or adjusted under 35 U.S.C. 154(b) by 119 days.

(21) Appl. No.: 10/724,196

(22) Filed: Dec. 1, 2003

(65) Prior Publication Data

US 2005/0116441 A1 Jun. 2, 2005

(51) Int. Cl.⁷ .............................................. B62K 15/00
(52) U.S. Cl. ........................ 280/278; 280/279; 280/284
(58) Field of Search ............................... 280/278, 287, 280/279, 280, 284, 288.4

(56) References Cited

U.S. PATENT DOCUMENTS

| | | | | | |
|---|---|---|---|---|---|
| 3,990,717 A | * | 11/1976 | Best | ............................ | 280/278 |
| 4,925,203 A | * | 5/1990 | Buckler | ...................... | 280/278 |
| 5,380,027 A | * | 1/1995 | Pong et al. | .................. | 280/279 |
| 5,452,910 A | * | 9/1995 | Harris | ........................ | 280/284 |
| 6,267,401 B1 | * | 7/2001 | De Jong | ..................... | 280/287 |
| 6,530,589 B1 | * | 3/2003 | Ma | ............................. | 280/278 |
| 6,595,539 B1 | * | 7/2003 | Belli | ........................ | 280/287 |
| 6,609,723 B2 | * | 8/2003 | Chuang | ..................... | 280/287 |
| 2004/0032110 A1 | * | 2/2004 | Bigot | ........................ | 280/287 |
| 2005/0017479 A1 | * | 1/2005 | Liu | ............................ | 280/287 |
| 2005/0035570 A1 | * | 2/2005 | Chu | ........................... | 280/278 |

FOREIGN PATENT DOCUMENTS

WO    WO 93/21055    * 10/1993

* cited by examiner

*Primary Examiner*—Anne Marie Boehler

(57) ABSTRACT

A foldable bicycle includes a front fork, a head tube, a support tube, an adjusting member, two support levers, a rear fork, and a hydraulic cylinder. Thus, when the foldable bicycle is folded, the rear wheel is in parallel with the front wheel, so that the user can simultaneously draw the rear wheel and the front wheel to move easily and conveniently, thereby facilitating the user moving the folded bicycle. In addition, the foldable bicycle is folded easily and conveniently, thereby facilitating the user folding the bicycle.

19 Claims, 10 Drawing Sheets

FOLDABLE BICYCLE

BACKGROUND OF THE INVENTION

1. Field of the Invention

The present invention relates to a foldable bicycle, and more particularly to a foldable bicycle whose front wheel and rear wheel are arranged in a parallel manner when the foldable bicycle is folded, so that the user can drive the folded bicycle to move forward easily and conveniently.

2. Description of the Related Art

A conventional foldable bicycle comprises a front frame having a front wheel, a rear frame having a rear wheel, and a folding device mounted between the front frame and the rear frame. In folding of the conventional foldable bicycle, the folding device functions as a pivot, so that the rear frame is pivoted relative to the front frame until the rear frame is rested on a side of the front frame, thereby folding the bicycle.

However, when the conventional foldable bicycle is folded, the front wheel and the rear wheel are directed toward different directions, so that the user cannot drive the folded bicycle to move forward and has to lift the folded bicycle for moving the folded bicycle, thereby causing inconvenience to the user and thereby consuming the user's energy.

SUMMARY OF THE INVENTION

The present invention is to mitigate and/or obviate the disadvantage of the conventional foldable bicycle.

The primary objective of the present invention is to provide a foldable bicycle whose front wheel and rear wheel are juxtaposed to each other in a parallel manner when the foldable bicycle is folded, so that the user can drive the folded bicycle to move forward easily and conveniently.

Another objective of the present invention is to provide a foldable bicycle whose volume is greatly reduced when the foldable bicycle is folded, thereby facilitating storage and transportation of the folded bicycle.

A further objective of the present invention is to provide a foldable bicycle, wherein when the foldable bicycle is folded, the rear wheel is in parallel with the front wheel, so that the user can simultaneously draw the rear wheel and the front wheel to move easily and conveniently, thereby facilitating the user moving the folded bicycle.

A further objective of the present invention is to provide a foldable bicycle, wherein the foldable bicycle is folded easily and conveniently, thereby facilitating the user folding the bicycle.

In accordance with the present invention, there is provided a foldable bicycle, comprising:

a front fork including a shaft tube, and a tubular holding arm rotatably mounted on the shaft tube, the shaft tube having a mediate portion rotatably mounted in the head tube, and a bent lower end protruded outward from the head tube and formed with an insertion section rotatably mounted on an upper end of the holding arm;

a head tube having a periphery provided with a connecting rod;

a support tube having a first end pivotally mounted on a distal end of the connecting rod and a second end having a periphery formed with a protruding first positioning block;

an adjusting member having a first end movably and rotatably mounted on the second end of the support tube and a second end provided with a seat post connected to a seat;

a rear fork having a first end having a periphery formed with a protruding second positioning block;

two support levers mounted between the second end of the support tube and the first end of the rear fork to connect the support tube and the rear fork, each of the two support levers having a first end pivotally mounted on a side of the first positioning block of the support tube and a second end pivotally mounted on a side of the second positioning block of the rear fork;

a first locking member pivotally mounted between the two support levers and engaged with the first positioning block of the support tube;

a first pressing member pivotally mounted between the two support levers and rested on the first locking member;

a second locking member pivotally mounted between the two support levers and engaged with the second positioning block of the rear fork; and a second pressing member pivotally mounted between the two support levers and rested on the second locking member.

Further benefits and advantages of the present invention will become apparent after a careful reading of the detailed description with appropriate reference to the accompanying drawings.

DETAILED DESCRIPTION OF THE INVENTION

Figure 1:
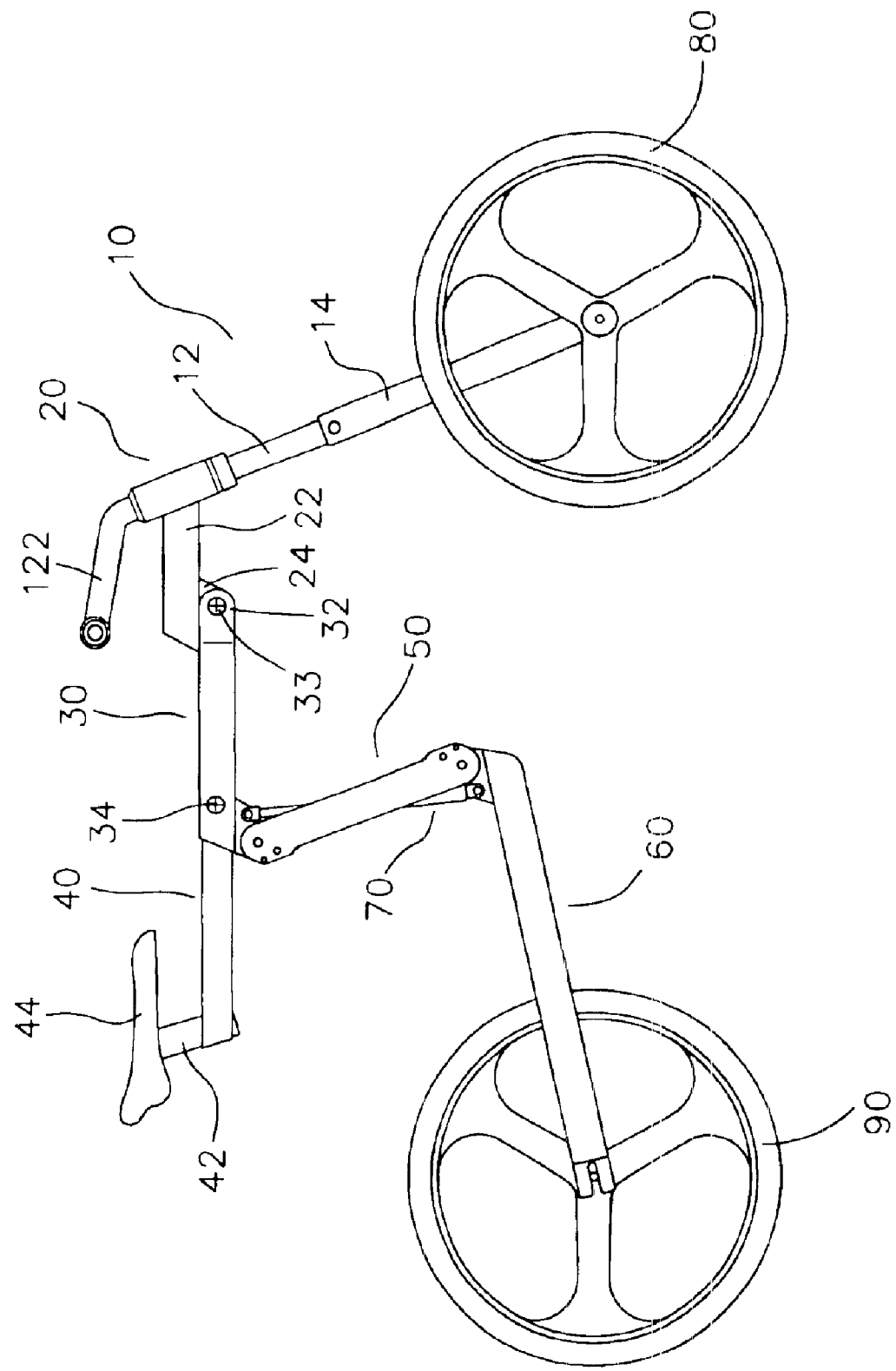
FIG. 1 is a side plan view of a foldable bicycle in accordance with the preferred embodiment of the present invention.
Figure 2:
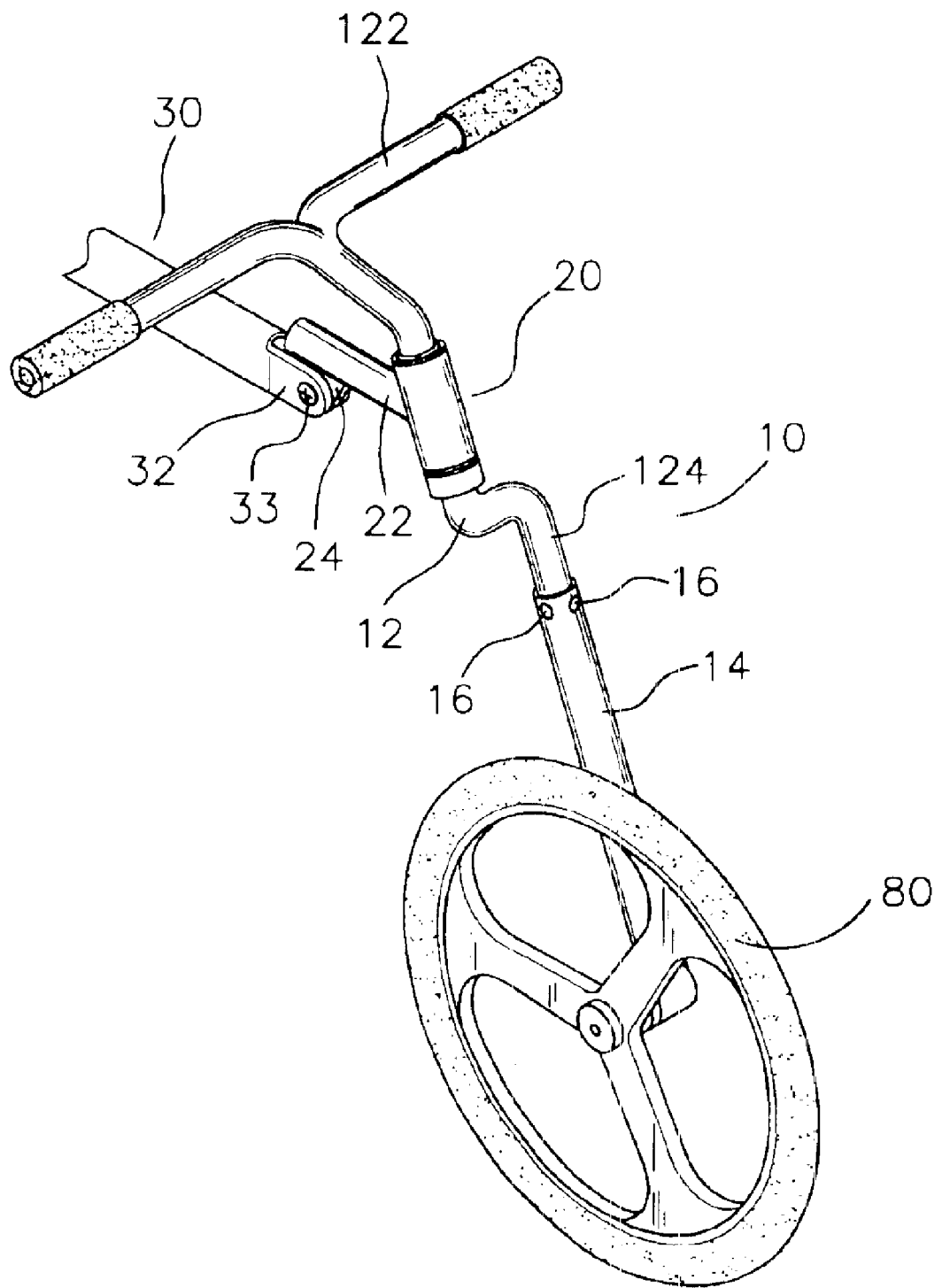
FIG. 2 is a partially perspective view of the foldable bicycle in accordance with the preferred embodiment of the present invention.
Figure 3:
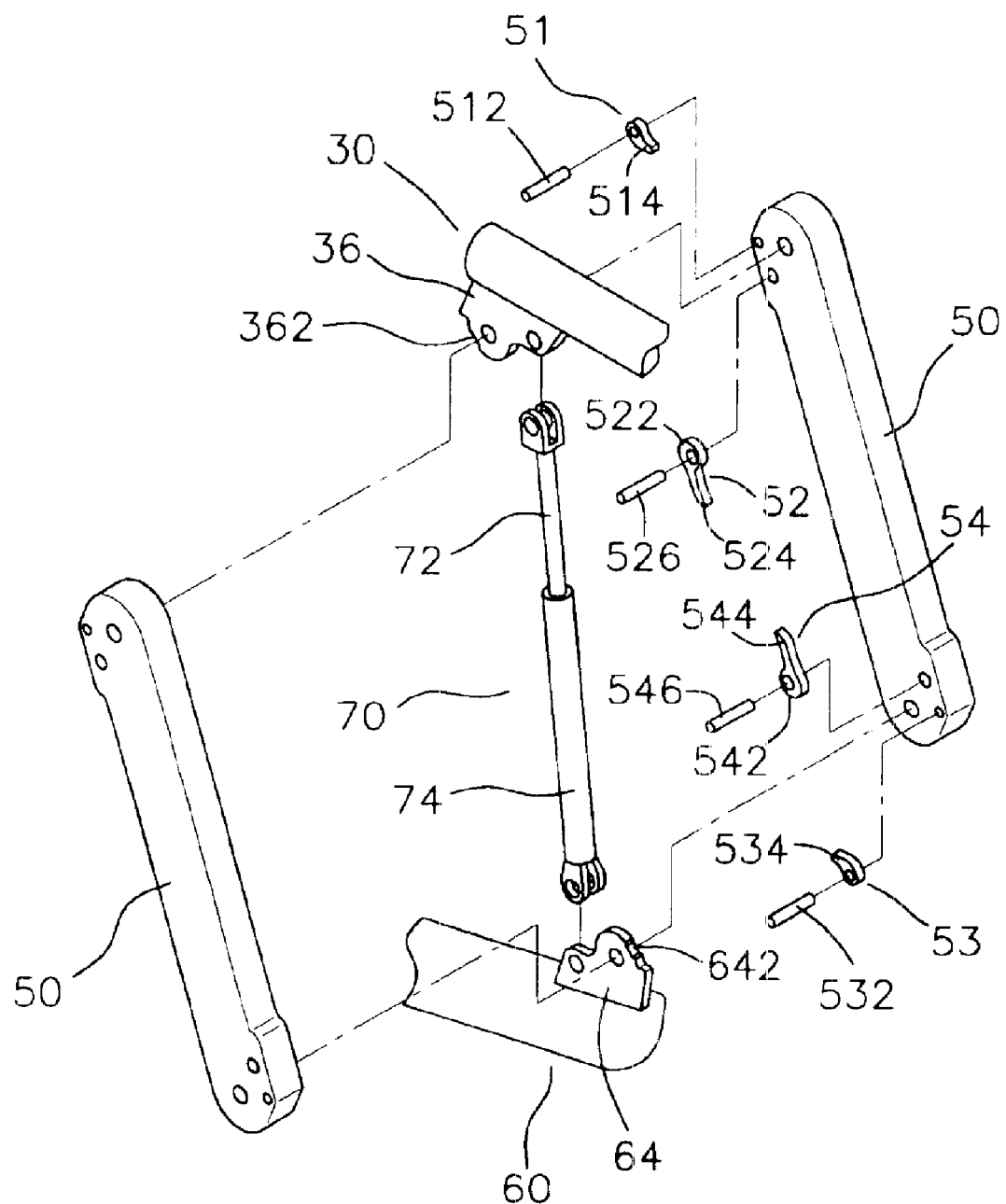
FIG. 3 is a partially exploded perspective view of the foldable bicycle in accordance with the preferred embodiment of the present invention.
Figure 4:
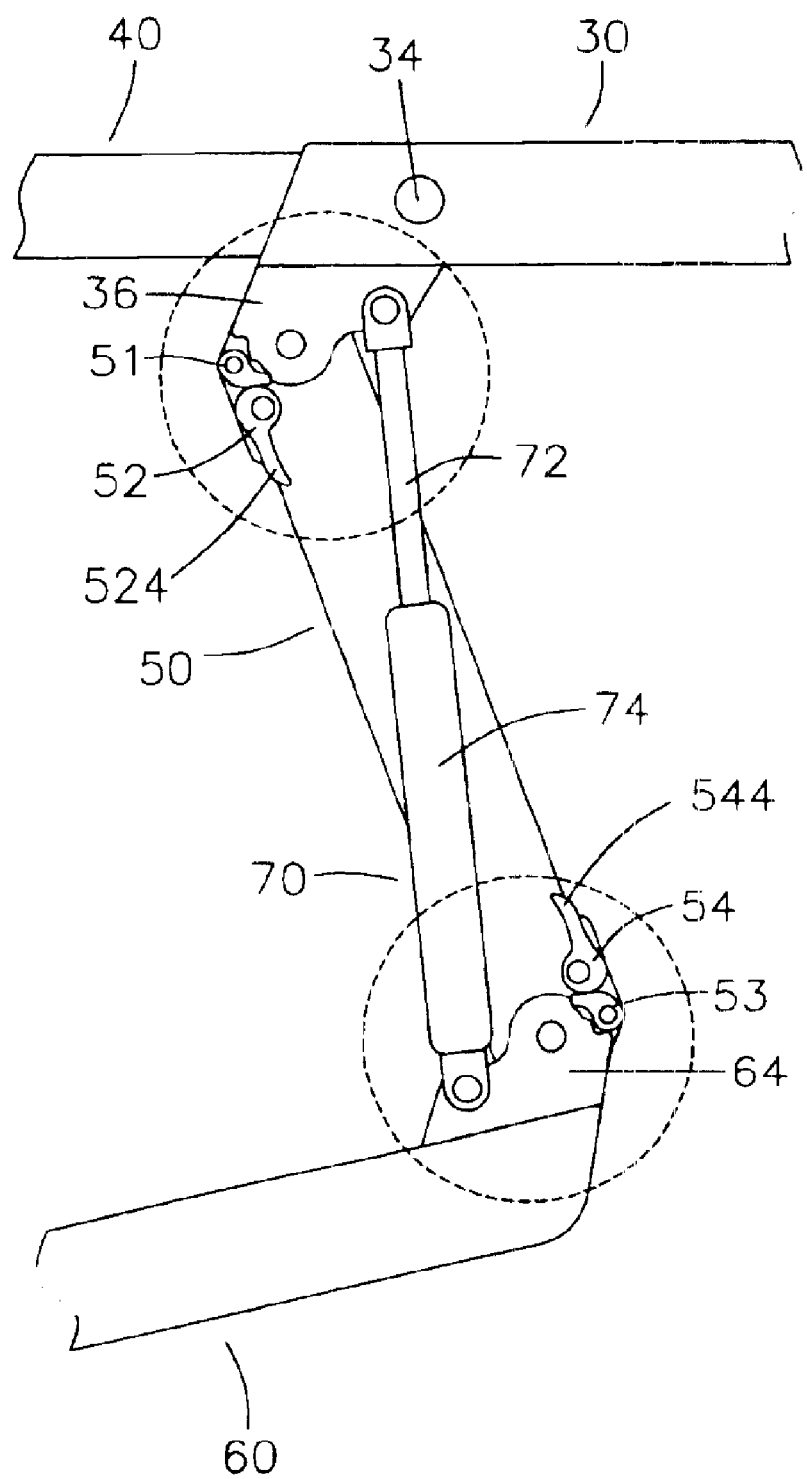
FIG. 4 is a side plan assembly view of the foldable bicycle as shown in FIG. 3.
Figure 5:
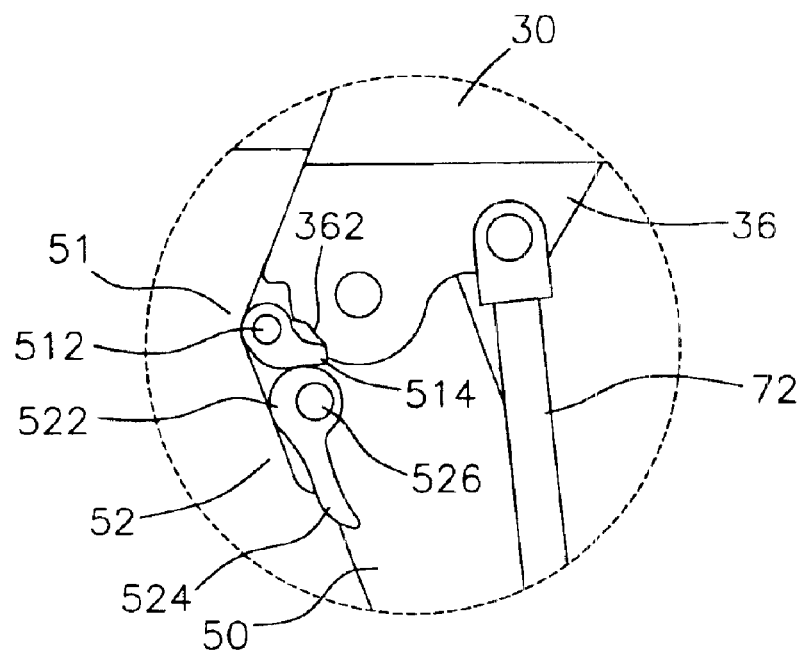
FIG. 5 is a partially enlarged view of the foldable bicycle as shown in FIG. 4.
Figure 6:
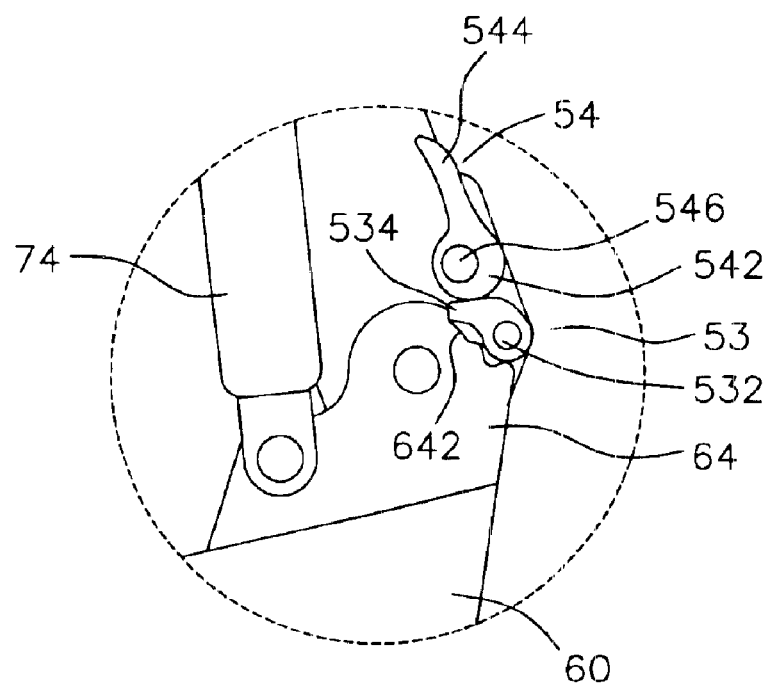
FIG. 6 is a partially enlarged view of the foldable bicycle as shown in FIG. 4.

Referring to the drawings and initially to FIGS. 1–3, a foldable bicycle in accordance with the preferred embodiment of the present invention comprises a front fork 10, a head tube 20, a support tube 30, an adjusting member 40, two support levers 50, a rear fork 60, and a hydraulic cylinder 70.

The front fork 10 is a single-arm body and includes a shaft tube 12, and a tubular holding arm 14 rotatably mounted on the shaft tube 12. The shaft tube 12 has a mediate portion rotatably mounted in the head tube 20, an upper end protruded outward from the head tube 20 and connected to a handlebar 122, and a bent lower end protruded outward from the head tube 20 and formed with an insertion section 124 rotatably mounted on an upper end of the holding arm 14. A front wheel 80 is rotatably mounted on a lower end of the holding arm 14. Preferably, the insertion section 124 of the shaft tube 12 is rotatably mounted on the upper end of the holding arm 14 by a plurality of spring-biased positioning pins 16.

The head tube 20 has a periphery provided with a connecting rod 22. The connecting rod 22 has a distal end having a periphery provided with a pivot portion 24.

The support tube 30 has a first end pivotally mounted on the distal end of the connecting rod 22. The first end of the support tube 30 is formed with a bifurcated pivot portion 32 pivotally mounted on the pivot portion 24 of the connecting rod 22 by a pivot pin 33.

The adjusting member 40 has a first end movably and rotatably mounted on a second end of the support tube 30 and a second end provided with a seat post 42 connected to a seat 44. The first end of the adjusting member 40 is locked on the second end of the support tube 30 by a locking device 34. Thus, the adjusting member 40 is movable relative to the support tube 30 to adjust the distance between the seat 44 and the handlebar 122.

The two support levers 50 are mounted between the second end of the support tube 30 and a first end of the rear fork 60 to connect the support tube 30 and the rear fork 60. A rear wheel 90 is rotatably mounted on a second end of the rear fork 60.

Referring to FIGS. 1–6, the second end of the support tube 30 has a periphery formed with a protruding first positioning block 36, and the first end of the rear fork 60 has a periphery formed with a protruding second positioning block 64. Each of the two support levers 50 has a first end pivotally mounted on a side of the first positioning block 36 of the support tube 30 and a second end pivotally mounted on a side of the second positioning block 64 of the rear fork 60.

The hydraulic cylinder 70 is mounted between the two support levers 50 and has a first end pivotally mounted on the support tube 30 and a second end pivotally mounted on the rear fork 60. The hydraulic cylinder 70 includes a mounting tube 74 having a first end pivotally mounted on the second positioning block 64 of the rear fork 60, and a shaft 72 having a first end pivotally mounted on the first positioning block 36 of the support tube 30 and a second end movably mounted in a second end of the mounting tube 74. Thus, the hydraulic cylinder 70 applies a push action to the support tube 30 and the rear fork 60.

A first locking member 51 is pivotally mounted between the two support levers 50 and engaged with the first positioning block 36 of the support tube 30, and a first pressing member 52 is pivotally mounted between the two support levers 50 and rested on the first locking member 51. The first positioning block 36 of the support tube 30 is formed with an arcuate first snapping recess 362. The first locking member 51 has a first end pivotally mounted between the two support levers 50 by a first pivot shaft 512 and a second end formed with an arc-shaped first snapping portion 514 snapped into the first snapping recess 362 of the first positioning block 36, so that the support tube 30 is locked between the two support levers 50 by the first locking member 51. The first pressing member 52 has a circular first end 522 having a periphery rested on a periphery of the first snapping portion 514 of the first locking member 51 and a second end formed with a handle 524. The first end 522 of the first pressing member 52 is pivotally mounted between the two support levers 50 by a first pivot axle 526. The first pivot axle 526 is eccentrically located on the first end 522 of the first pressing member 52.

A second locking member 53 is pivotally mounted between the two support levers 50 and engaged with the second positioning block 64 of the rear fork 60, and a second pressing member 54 is pivotally mounted between the two support levers 50 and rested on the second locking member 53. The second positioning block 64 of the rear fork 60 is formed with an arcuate second snapping recess 642. The second locking member 53 has a first end pivotally mounted between the two support levers 50 by a second pivot shaft 532 and a second end formed with an arc-shaped second snapping portion 534 snapped into the second snapping recess 642 of the second positioning block 64, so that the rear fork 60 is locked between the two support levers 50 by the second locking member 53. The second pressing member 54 has a circular first end 542 having a periphery rested on a periphery of the second snapping portion 534 of the second locking member 53 and a second end formed with a handle 544. The first end 542 of the second pressing member 54 is pivotally mounted between the two support levers 50 by a second pivot axle 546. The second pivot axle 546 is eccentrically located on the first end 542 of the second pressing member 54.

In practice, the front wheel 80 is located at a side of the holding arm 14 and located under the head tube 20, and the rear wheel 90 is mounted on the second end of the rear fork 60. In addition, the first end 522 of the first pressing member 52 is rested on the periphery of the first snapping portion 514 of the first locking member 51, so that the first snapping portion 514 of the first locking member 51 is locked in the first snapping recess 362 of the first positioning block 36. Thus, the support tube 30 is locked between the two support levers 50 by the first locking member 51. Similarly, the first end 542 of the second pressing member 54 is rested on the periphery of the second snapping portion 534 of the second locking member 53, so that the second snapping portion 534 of the second locking member 53 is locked in the second snapping recess 642 of the second positioning block 64. Thus, the rear fork 60 is locked between the two support levers 50 by the second locking member 53.

Figure 7:
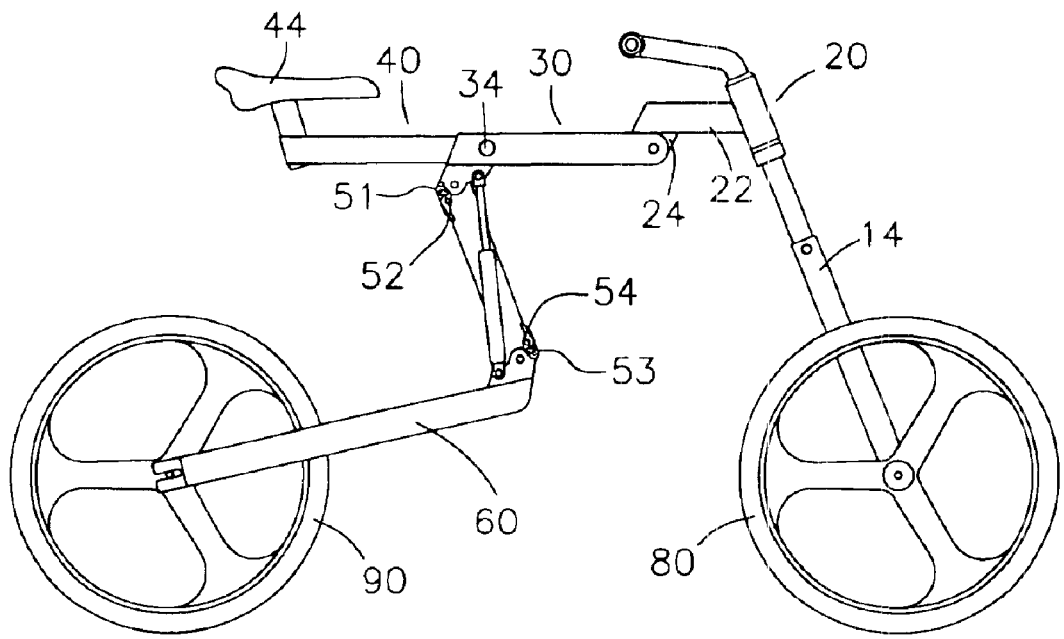
FIG. 7 is a side plan view of the foldable bicycle in accordance with the preferred embodiment of the present invention.
Figure 8:
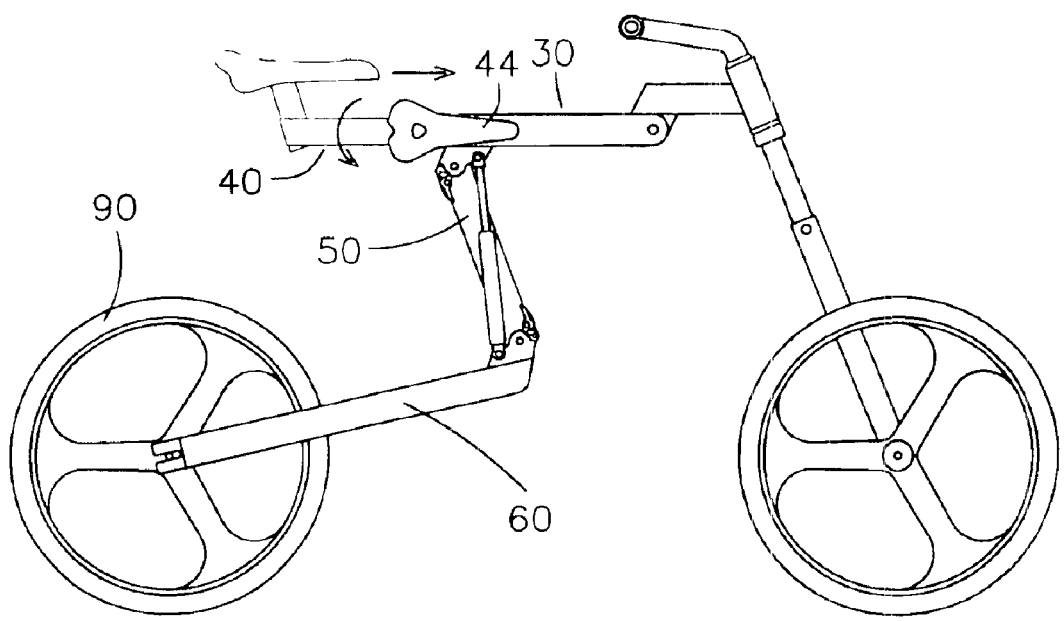
FIG. 8 is a schematic operational view of the foldable bicycle as shown in FIG. 7.

In operation, the locking device 34 is loosened, so that the adjusting member 40 is movable relative to the support tube 30. Then, the adjusting member 40 is moved to fully retract into the support tube 30 and is rotated through 90 degrees, so that the seat 44 is moved from the position as shown in FIG. 7 to the position as shown in FIG. 8. In such a manner, the seat 44 is juxtaposed to the support tube 30, so that a space is formed behind the second end of the support tube 30 and the adjusting member 40.

Subsequently, the handle 544 of the second pressing member 54 is driven, so that the first end 542 of the second pressing member 54 is rotated about the second pivot axle 546 eccentrically, thereby releasing the second locking member 53 from the second pressing member 54, so that the second snapping portion 534 of the second locking member 53 is detached from the second snapping recess 642 of the second positioning block 64. Thus, the rear fork 60 is detached from the two support levers 50 by releasing the second locking member 53, so that the rear fork 60 can be pivoted relative to the two support levers 50.

Figure 9:
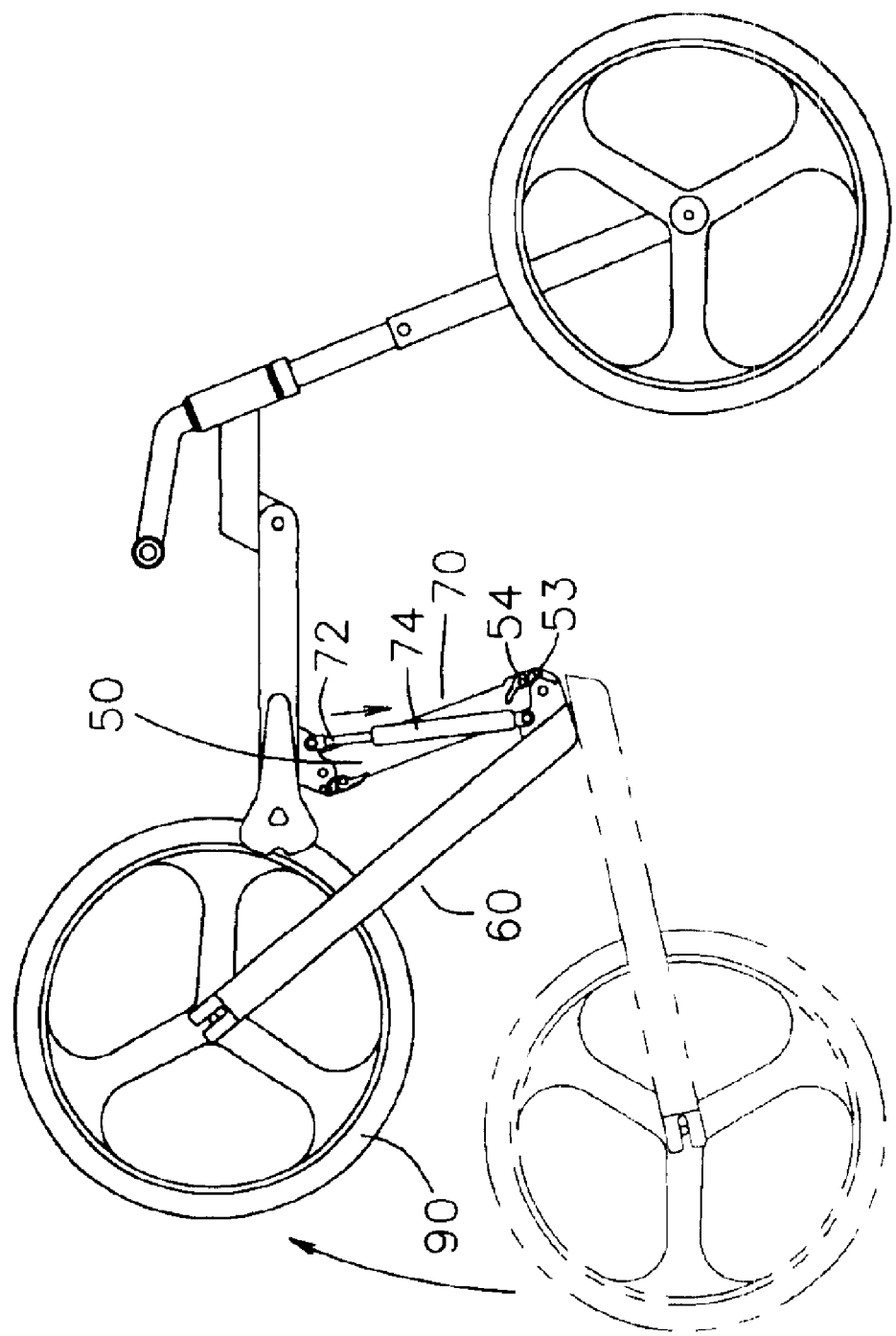
FIG. 9 is a schematic operational view of the foldable bicycle as shown in FIG. 8.

Then, the rear fork 60 is pivoted upward relative to the two support levers 50 to move from the position as shown in FIG. 8 to the position as shown in FIG. 9, so that the rear wheel 90 is folded in the space formed behind the adjusting member 40. At this time, the hydraulic cylinder 70 is compressed by pivot of the rear fork 60.

Subsequently, the handle 524 of the first pressing member 52 is driven, so that the first end 522 of the first pressing member 52 is rotated about the first pivot axle 526 eccentrically, thereby releasing the first locking member 51 from the first pressing member 52, so that the first snapping portion 514 of the first locking member 51 is detached from the first snapping recess 362 of the first positioning block 36. Thus, the support tube 30 is detached from the two support levers 50 by releasing the first locking member 51, so that the two support levers 50 can be pivoted relative to the support tube 30.

Figure 10:
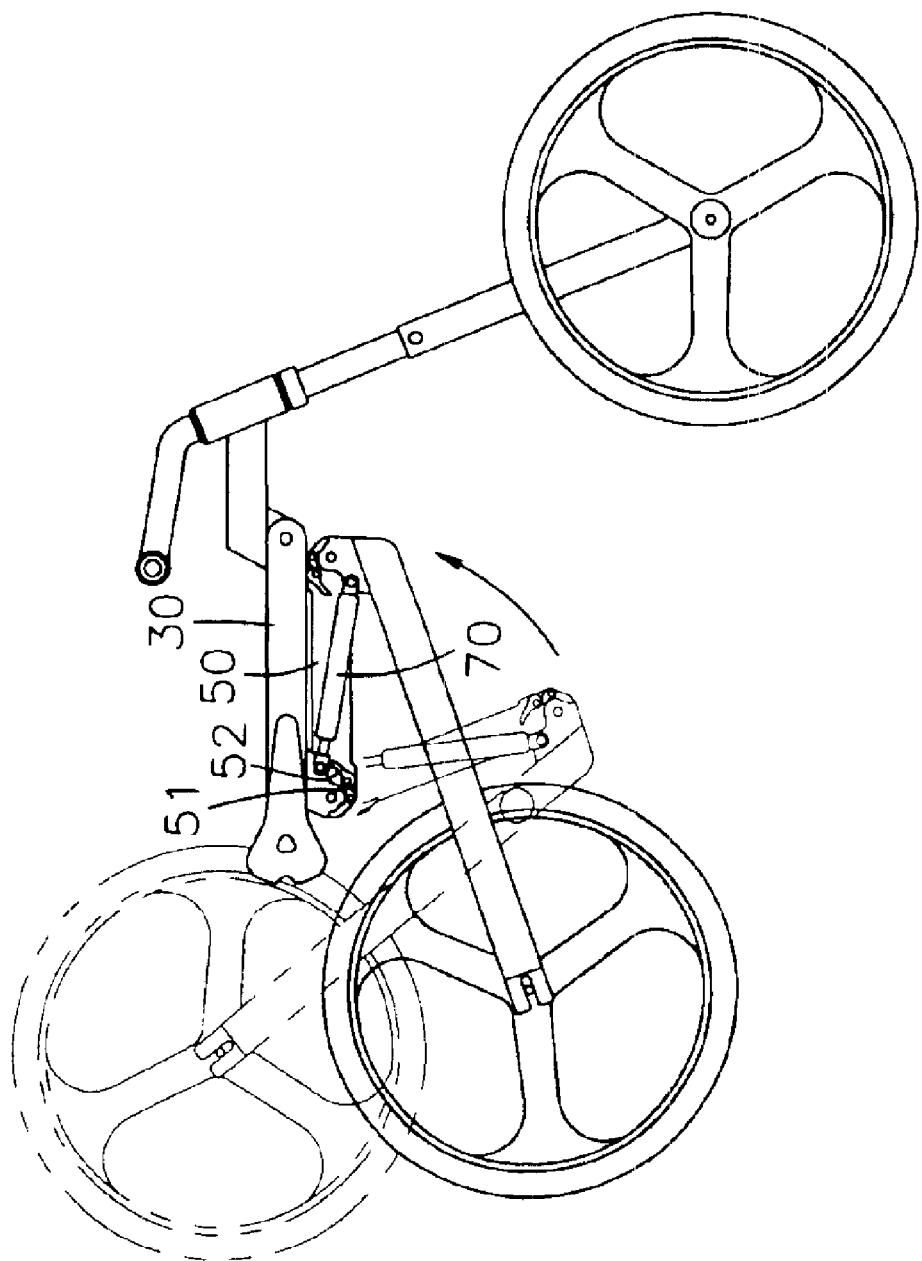
FIG. 10 is a schematic operational view of the foldable bicycle as shown in FIG. 9.

Then, the two support levers 50 are pivoted upward relative to the support tube 30 to move from the position as shown in FIG. 9 to the position as shown in FIG. 10, so that the two support levers 50 and the hydraulic cylinder 70 are folded in the space under the support tube 30. At this time, the hydraulic cylinder 70 is fully compressed by pivot of the two support levers 50.

Subsequently, the spring-biased positioning pins 16 are pressed to detach the shaft tube 12 from the holding arm 14, so that the holding arm 14 can be rotated relative to the shaft tube 12.

Figure 11:
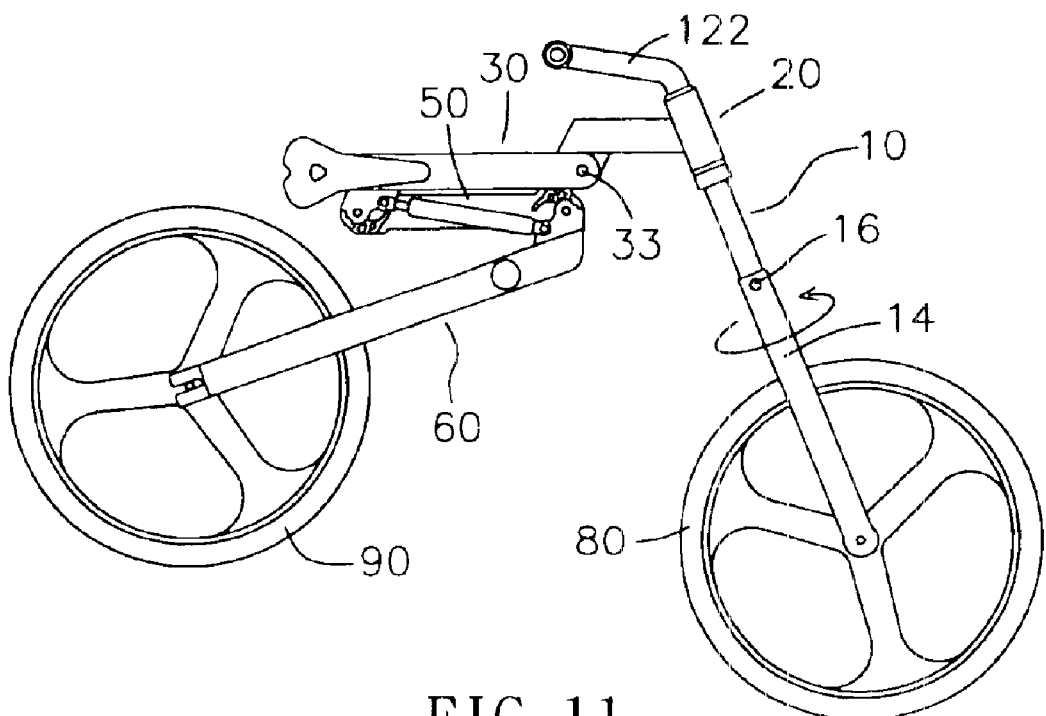
FIG. 11 is a schematic operational view of the foldable bicycle as shown in FIG. 10.
Figure 12:
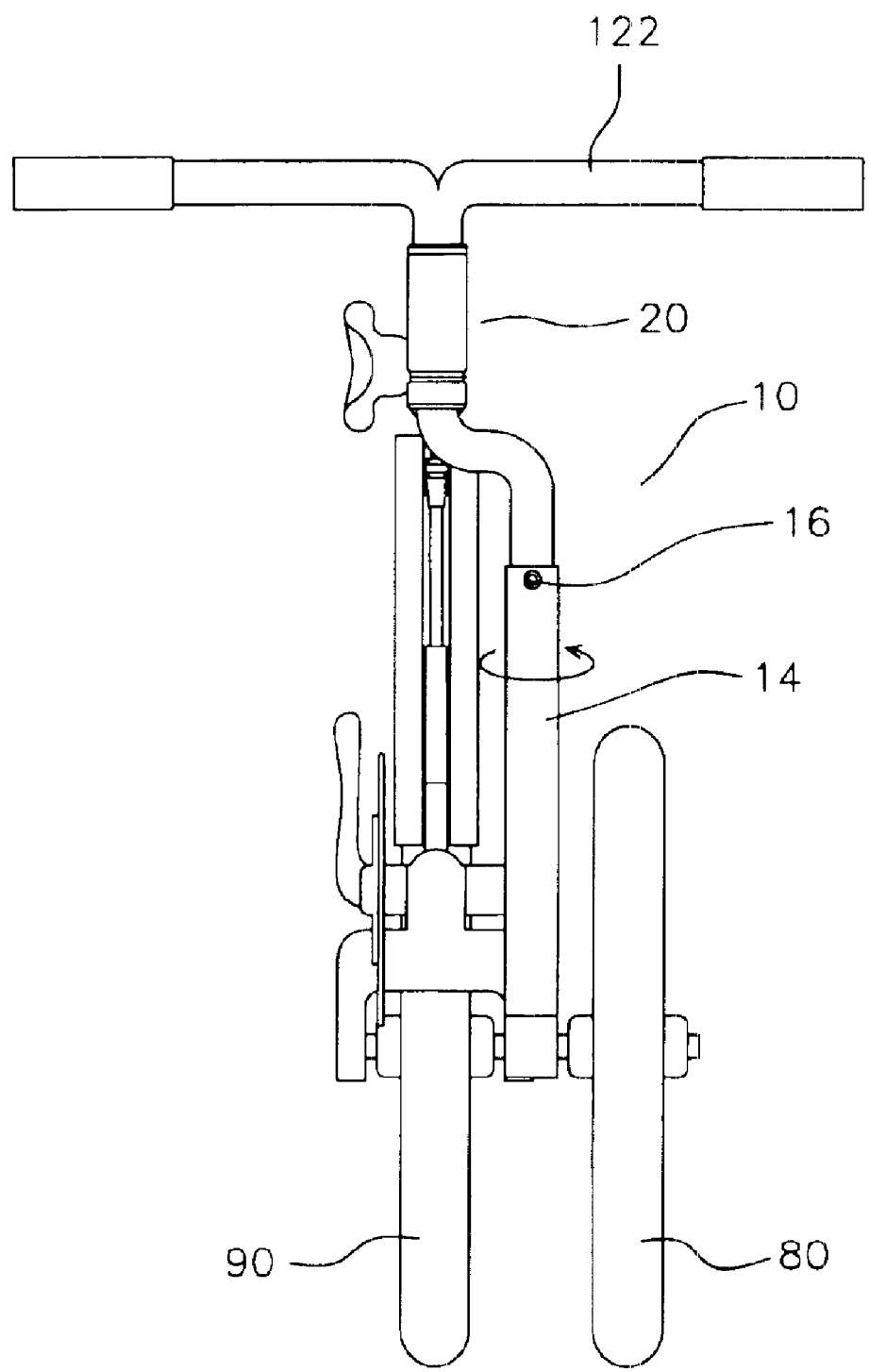
FIG. 12 is a schematic operational view of the foldable bicycle as shown in FIG. 11.

Then, the holding arm 14 is rotated relative to the shaft tube 12 through 180 degrees, so that the front wheel 80 is moved with the holding arm 14 and is turned to the outer side of the front fork 10 as shown in FIGS. 11 and 12. Thus, the space under the head tube 20 is empty.

Figure 13:
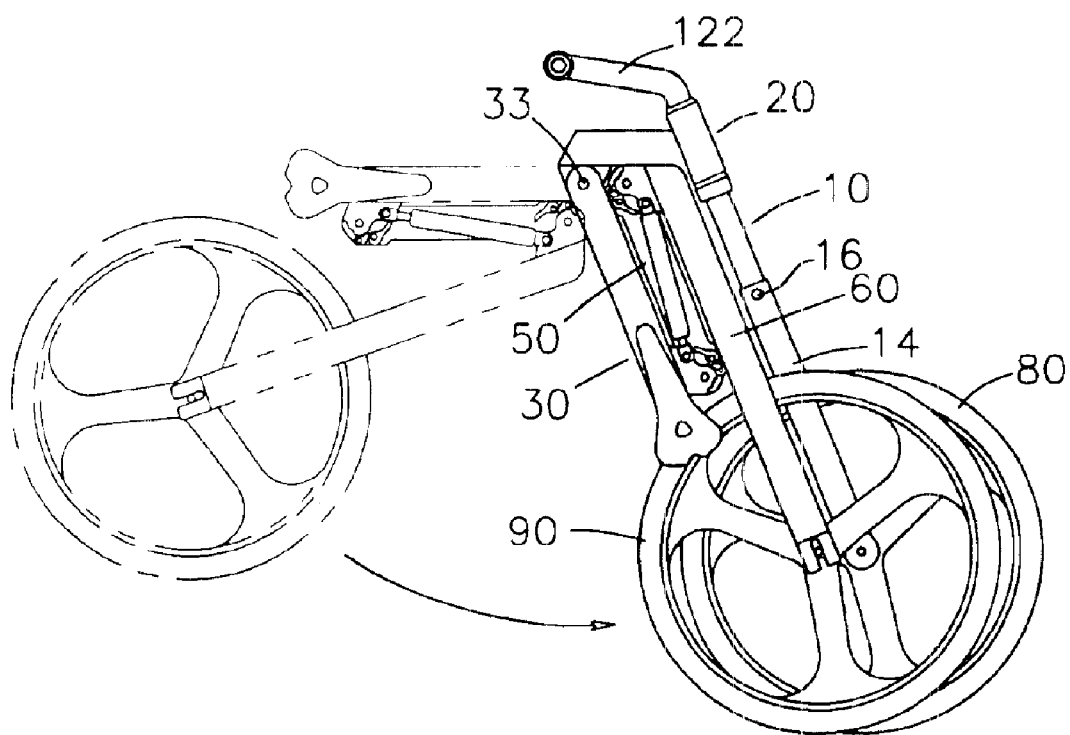
FIG. 13 is a schematic operational view of the foldable bicycle as shown in FIG. 11.

Finally, the support tube 30 is pivoted downward about the pivot pin 33 to move from the position as shown in FIG. 11 to the position as shown in FIG. 13, so that the rear fork 60 is juxtaposed to the front fork 10 as shown in FIG. 13, and the rear wheel 90 is stored in the space under the head tube 20 shown in FIG. 12. Thus, the foldable bicycle is folded.

At this time, the rear wheel 90 is juxtaposed to the holding arm 14 and in parallel with the front wheel 80 shown in FIG. 12 while the two support levers 50 and the rear fork 60 are located between the front fork 10 and the support tube 30 as shown in FIG. 13.

Alternatively, when the foldable bicycle is expanded, the hydraulic cylinder 70 applies a restoring force to push and expand the support tube 30, the two support levers 50 and the rear fork 60, thereby facilitating expansion of the foldable bicycle.

Accordingly, when the foldable bicycle is folded, the rear wheel 90 is in parallel with the front wheel 80, so that the user can simultaneously draw the rear wheel 90 and the front wheel 80 to move easily and conveniently, thereby facilitating the user moving the folded bicycle. In addition, the foldable bicycle can folded easily and conveniently, thereby facilitating the user folding the bicycle.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A foldable bicycle, comprising:
   a front fork including a shaft tube, and a tubular holding arm rotatably mounted on the shaft tube, the shaft tube having a mediate portion rotatably mounted in a head tube, and a bent lower end protruded outward from the head tube and formed with an insertion section rotatably mounted on an upper end of the holding arm;
   the head tube having a periphery provided with a connecting rod;
   a support tube having a first end pivotally mounted on a distal end of the connecting rod and a second end having a periphery formed with a protruding first positioning block;
   an adjusting member having a first end movably and rotatably mounted on the second end of the support tube and a second end provided with a seat post connected to a seat;
   a rear fork having a first end having a periphery formed with a protruding second positioning block;
   two support levers mounted between the second end of the support tube and the first end of the rear fork to connect the support tube and the rear fork, each of the two support levers having a first end pivotally mounted on a side of the first positioning block of the support tube and a second end pivotally mounted on a side of the second positioning block of the rear fork;
   a first locking member pivotally mounted between the two support levers and engaged with the first positioning block of the support tube;
   a first pressing member pivotally mounted between the two support levers and rested on the first locking member;
   a second locking member pivotally mounted between the two support levers and engaged with the second positioning block of the rear fork; and
   a second pressing member pivotally mounted between the two support levers and rested on the second locking member.

2. The foldable bicycle in accordance with claim 1, further comprising a hydraulic cylinder having a first end pivotally mounted on the support tube and a second end pivotally mounted on the rear fork.

3. The foldable bicycle in accordance with claim 2, wherein the hydraulic cylinder includes a mounting tube having a first end pivotally mounted on the second positioning block of the rear fork, and a shaft having a first end pivotally mounted on the first positioning block of the support tube and a second end movably mounted in a second end of the mounting tube.

4. The foldable bicycle in accordance with claim 2, wherein the hydraulic cylinder is mounted between the two support levers.

5. The foldable bicycle in accordance with claim 1, wherein the first positioning block of the support tube is formed with an arcuate first snapping recess, and the first locking member has a first end pivotally mounted between the two support levers by a first pivot shaft and a second end formed with an arc-shaped first snapping portion snapped into the first snapping recess of the first positioning block, so that the support tube is locked between the two support levers by the first locking member.

6. The foldable bicycle in accordance with claim 5, wherein the first pressing member has a circular first end having a periphery rested on a periphery of the first snapping portion of the first locking member and a second end formed with a handle.

7. The foldable bicycle in accordance with claim 6, wherein the first end of the first pressing member is pivotally mounted between the two support levers by a first pivot axle.

8. The foldable bicycle in accordance with claim 7, wherein the first pivot axle is eccentrically located on the first end of the first pressing member.

9. The foldable bicycle in accordance with claim 1, wherein the second positioning block of the rear fork is formed with an arcuate second snapping recess, and the second locking member has a first end pivotally mounted between the two support levers by a second pivot shaft and a second end formed with an arc-shaped second snapping portion snapped into the second snapping recess of the second positioning block, so that the rear fork is locked between the two support levers by the second locking member.

10. The foldable bicycle in accordance with claim 9, wherein the second pressing member has a circular first end having a periphery rested on a periphery of the second snapping portion of the second locking member and a second end formed with a handle.

11. The foldable bicycle in accordance with claim 10, wherein the first end of the second pressing member is pivotally mounted between the two support levers by a second pivot axle.

12. The foldable bicycle in accordance with claim 11, wherein the second pivot axle is eccentrically located on the first end of the second pressing member.

13. The foldable bicycle in accordance with claim 1, wherein the insertion section of the shaft tube is rotatably mounted on the upper end of the holding arm by a plurality of spring-biased positioning pins.

14. The foldable bicycle in accordance with claim 1, wherein the distal end of the connecting rod has a periphery provided with a pivot portion, and the first end of the support tube is formed with a bifurcated pivot portion pivotally mounted on the pivot portion of the connecting rod by a pivot pin.

15. The foldable bicycle in accordance with claim 1, wherein the first end of the adjusting member is locked on the second end of the support tube by a locking device.

16. The foldable bicycle in accordance with claim 1, further comprising a front wheel rotatably mounted on a lower end of the holding arm, wherein the front wheel is located at a side of the holding arm and located under the head tube.

17. The foldable bicycle in accordance with claim 1, further comprising a rear wheel rotatably mounted on a second end of the rear fork.

18. The foldable bicycle in accordance with claim 1, wherein the front fork is a single-arm body.

19. The foldable bicycle in accordance with claim 1, wherein the shaft tube having an upper end protruded outward from the head tube and connected to a handlebar.

* * * * *